(12) United States Patent
Chen

(10) Patent No.: US 9,742,295 B2
(45) Date of Patent: *Aug. 22, 2017

(54) FLYBACK-BASED POWER CONVERSION APPARATUS WITH MULTI-FUNCTIONAL PIN

(71) Applicant: Power Forest Technology Corporation, Hsinchu County (TW)

(72) Inventor: Chun-Teh Chen, Taichung (TW)

(73) Assignee: Power Forest Technology Corporation, Hsinchu County (TW)

( * ) Notice: Subject to any disclaimer, the term of this patent is extended or adjusted under 35 U.S.C. 154(b) by 13 days.

This patent is subject to a terminal disclaimer.

(21) Appl. No.: 14/884,784

(22) Filed: Oct. 16, 2015

(65) Prior Publication Data

US 2017/0012539 A1  Jan. 12, 2017

(30) Foreign Application Priority Data

Jul. 9, 2015 (TW) .............................. 104122350 A

(51) Int. Cl.
*H02M 3/335* (2006.01)
*H02M 1/00* (2006.01)

(52) U.S. Cl.
CPC .............. *H02M 3/33523* (2013.01); *H02M 2001/0009* (2013.01)

(58) Field of Classification Search
CPC ............. H02M 3/335; H02M 3/33507; H02M 3/33515; H02M 3/33523; H02M 3/33538; H02M 3/33546; H02M 3/33553; H02M 1/32
USPC ............................ 363/21.04–21.18, 50–56.12
See application file for complete search history.

(56) References Cited

U.S. PATENT DOCUMENTS

| 7,635,956 | B2 | 12/2009 | Huynh et al. |
| 9,479,069 | B2 * | 10/2016 | Chen ..................... H02M 1/32 |
| 2012/0120533 | A1 * | 5/2012 | Huang ............. H02M 3/33507 361/56 |

(Continued)

FOREIGN PATENT DOCUMENTS

TW  201404017  1/2014

OTHER PUBLICATIONS

"Office Action of Taiwan Counterpart Application", issued on May 2, 2016, p. 1-p. 4.

*Primary Examiner* — Alex Torres-Rivera
(74) *Attorney, Agent, or Firm* — Jianq Chyun IP Office

(57) ABSTRACT

A power conversion apparatus including a flyback power conversion circuit, a control chip and a detection auxiliary circuit is provided. The flyback power conversion circuit converts an input voltage into a direct current (DC) output voltage. The control chip generates a pulse width modulation (PWM) signal for controlling operations of the flyback power conversion circuit. The detection auxiliary circuit assists the control chip in obtaining a first detection voltage via a multi-function detection pin of the control chip within an enabling period of the PWM signal, so as to execute an over current detection according to the first detection voltage. Besides, the detection auxiliary circuit assists the control chip in obtaining a second detection voltage via the multi-function detection pin within a disabling period of the PWM signal, so as to execute a valley voltage detection according to the second detection voltage.

16 Claims, 5 Drawing Sheets

(56) References Cited

U.S. PATENT DOCUMENTS

| | | | | |
|---|---|---|---|---|
| 2014/0016378 A1* | 1/2014 | Ke et al. | ............... | H02H 7/1213 |
| | | | | 363/21.18 |
| 2014/0085947 A1* | 3/2014 | Capilla et al. | ....... | H02M 1/4225 |
| | | | | 363/52 |
| 2015/0035508 A1* | 2/2015 | Kim et al. | ........ | H02M 3/33507 |
| | | | | 323/282 |
| 2016/0007417 A1* | 1/2016 | Gao et al. | .......... | H05B 33/0815 |
| | | | | 315/219 |
| 2016/0190936 A1* | 6/2016 | Ke | .................... | H02M 3/33507 |
| | | | | 363/21.12 |

* cited by examiner

FLYBACK-BASED POWER CONVERSION APPARATUS WITH MULTI-FUNCTIONAL PIN

CROSS-REFERENCE TO RELATED APPLICATION

This application claims the priority benefit of Taiwan application serial no. 104122350, filed on Jul. 9, 2015. The entirety of the above-mentioned patent application is hereby incorporated by reference herein and made a part of this specification.

BACKGROUND OF THE INVENTION

1. Field of the Invention

The invention relates to a power conversion technique, and more particularly, to a flyback-based power conversion apparatus.

2. Description of Related Art

The primary purpose of applying a power conversion apparatus is to convert an unstable and high alternating current input voltage supplied by the power company to a stable and low direct current (DC) output voltage suitable for various electronic devices. Therefore, the power conversion apparatus is widely used in computers, office automatic facilities, industrial control equipments, communication apparatuses and so on.

Pulse width modulation (PWM) control chip is applied in most of the control structures of recent power conversion apparatuses. To protect the power conversion apparatus from being damaged because of over voltage (OV) and over current (OC), the PWM control chip usually has a plurality of isolated detection pins for respectively executing detection and protection mechanisms, such as over current protection (OCP), valley voltage detection and over voltage protection (OVP). In other words, each of the detection pins of the PWM control chip is only corresponding to one type of function detections, and thus the overall production cost of the PWM control chip is difficult to be lowered.

SUMMARY OF THE INVENTION

In view of the above, the invention provides a flyback-based power conversion apparatus for solving the problem as mentioned in Description of Related Art.

The power conversion apparatus of the invention includes a flyback power conversion circuit, a control chip and a detection auxiliary circuit. The flyback power conversion circuit is configured to receive an input voltage and convert the input voltage in response to a pulse width modulation (PWM) signal, so as to generate a direct current (DC) output voltage and provide the DC output voltage to a load. The control chip is coupled to the flyback power conversion circuit to generate the PWM signal for controlling operations of the flyback power conversion circuit, wherein the control chip has a multi-function detection pin. The detection auxiliary circuit is coupled to the flyback power conversion circuit and the multi-function detection pin of the control chip. The detection auxiliary circuit assists the control chip to obtain a first detection voltage via the multi-function detection pin within an enabling period of the PWM signal, so as to execute an over current detection according to the first detection voltage. The detection auxiliary circuit assists the control chip to obtain a second detection voltage via the multi-function detection pin within a disabling period of the PWM signal, so as to execute a valley voltage detection according to the second detection voltage.

In an embodiment of the invention, the control chip includes a main control circuit, an over current detection circuit and a valley voltage detection circuit. The main control circuit is configured to serve as an operation core of the control chip, and generate the PWM signal in response to a power supplying requirement. The over current detection circuit is coupled between the multi-function detection pin and the main control circuit, and configured to execute the over current detection in response to the first detection voltage within the enabling period of the PWM signal, and thereby provide a first detection result to the main control circuit, wherein the main control circuit determines whether to activate an over current protection mechanism in response to the first detection result. The valley voltage detection circuit is coupled between the multi-function detection pin and the main control circuit, and configured to execute the valley voltage detection in response to the second detection voltage within the disabling period of the PWM signal, and thereby provide a second detection result to the main control circuit, wherein the main control circuit determines whether to enable the PWM signal in response to the second detection result.

In an embodiment of the invention, within the enabling period of the PWM signal, the over current detection circuit compares the first detection voltage with an over current reference voltage. When determining that the first detection voltage is greater than the over current reference voltage, the over current detection circuit outputs the first detection result for indicating that an over current has occurred. When determining that the first detection voltage is smaller than the over current reference voltage, the over current detection circuit outputs the first detection result for indicating that the over current has not occurred.

In an embodiment of the invention, when the main control circuit receives the first detection result for indicating that the over current has occurred, the main control circuit activated the over current protection mechanism so as to suspend outputting the PWM signal, and when the main control circuit receives the first detection result for indicating that the over current has not occurred, the main control circuit turns off the over current protection mechanism so as to resume outputting the PWM signal.

In an embodiment of the invention, within the disabling period of the PWM signal, the valley voltage detection circuit compares the second detection voltage with a valley reference voltage. When determining that the second detection voltage is greater than the valley reference voltage, the valley voltage detection circuit outputs the second detection result for indicating that a resonance has not occurred. When determining that the second detection voltage is smaller than the valley reference voltage and reaches a predetermined period, the valley voltage detection circuit outputs the second detection result for indicating that the resonance has occurred.

In an embodiment of the invention, when the main control circuit receives the second detection result for indicating that the resonance has not occurred, the main control circuit keeps the PWM signal at a disable level, and when the main control circuit receives the second detection result for indicating that the resonance has occurred, the main control circuit adjusts the PWM signal to an enable level.

In an embodiment of the invention, the main control circuit further defines a masked period according to a frequency of the PWM signal, and the main control circuit does not perform an action of determining whether to adjust the level of the PWM signal according to the second detection result within the masked period.

In an embodiment of the invention, the control chip further has a feedback pin. The control chip obtains a feedback voltage related to a load state from the feedback pin. The control chip further includes a voltage controlled oscillating circuit. The voltage controlled oscillating circuit is configured to generate a clock adjustment signal according to the feedback voltage, so that the main control circuit adjusts the frequency of the PWM signal according to the clock adjustment signal, wherein the main control circuit further sets a length of the masked period according to the clock adjustment signal.

In an embodiment of the invention, the control chip further includes an over voltage detection circuit. The over voltage detection circuit is coupled between the multi-function detection pin and the main control circuit, and configured to execute an over voltage/under voltage detection in response to the second detection voltage within the disabling period of the PWM signal, and thereby provide a third detection result to the main control circuit, wherein the main control circuit determines whether to activate an over voltage/under voltage protection mechanism in response to the third detection result.

In an embodiment of the invention, within the disabling period of the PWM signal, the over voltage detection circuit determines whether the second detection voltage is in a working voltage range. When determining that the second detection voltage is outside of the working voltage range, the over voltage detection circuit outputs the third detection result for indicating that an over voltage/under voltage has occurred. When determining that the second detection voltage is in the working voltage range, the over voltage detection circuit outputs the third detection result for indicating that the over voltage/under voltage has not occurred.

In an embodiment of the invention, wherein when the main control circuit receives the third detection result for indicating that the over voltage/under voltage has occurred, the main control circuit activates the over voltage/under voltage protection mechanism so as to suspend outputting the PWM signal, and when the main control circuit receives the third detection result for indicating that the over voltage/ under voltage has not occurred, the main control circuit turns off the over voltage/under voltage protection mechanism so as to resume outputting the PWM signal.

In an embodiment of the invention, the over voltage detection circuit performs an action of determining whether the second detection voltage is in the working voltage range after a delay period.

In an embodiment of the invention, the over voltage detection circuit further samples the second detection voltage with a predetermined time interval according to a sampling clock signal, determines whether the sampled second detection voltage is in a working voltage range, and then generates a count value according to a determination result, wherein the over voltage detection circuit compares the count value with a threshold value. The over voltage detection circuit outputs the third detection result for indicating that an over voltage/under voltage has occurred when determining that the count value reaches the threshold value, and outputs the third detection result for indicating that the over voltage/under voltage has not occurred when determining that the count value does not reach the threshold value.

In an embodiment of the invention, the flyback power conversion circuit includes a transformer, a power switch, a first resistor, a first diode, a capacitor and a second diode. The transformer has a primary winding, a secondary winding and an auxiliary winding, wherein an opposite-polarity terminal of the primary winding is configured to receive the input voltage, an opposite-polarity terminal of the auxiliary winding is coupled to a first grounding terminal, and an opposite-polarity terminal of the secondary winding is coupled to a second grounding terminal. The power switch has a first terminal coupled to a common-polarity terminal of the primary winding, and has a control terminal coupled to the control chip for receiving the PWM signal. A first terminal of the first resistor is coupled to a second terminal of the power switch and the multi-function detection pin, and a second terminal of the first resistor is coupled to the first grounding terminal. An anode of the first diode is coupled to a common-polarity terminal of the secondary winding, and a cathode of the first diode outputs the DC output voltage. The capacitor is coupled between the cathode of the first diode and the second grounding terminal. An anode of the second diode is coupled to a common-polarity terminal of the auxiliary winding, and a cathode of the second diode outputs a DC system voltage to the control chip.

In an embodiment of the invention, the detection auxiliary circuit includes a third diode and a second resistor. An anode of the third diode is coupled to the common-polarity terminal of the auxiliary winding and the anode of the second diode. A first terminal of the second resistor is coupled to a cathode of the third diode, and a second terminal of the second resistor is coupled to the multi-function detection pin.

Based on the above, the power conversion apparatus, as provided according to the embodiments of the invention, with effects of the detection auxiliary circuit, is capable of allowing the control chip to realize various different control, detection and protection functions through the configuration in which a single multi-function detection pin is commonly used. As a result, in addition to providing various related detection functions and control methods, the single multi-function detection pin of the control chip may further lower the overall production costs of the control chip.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
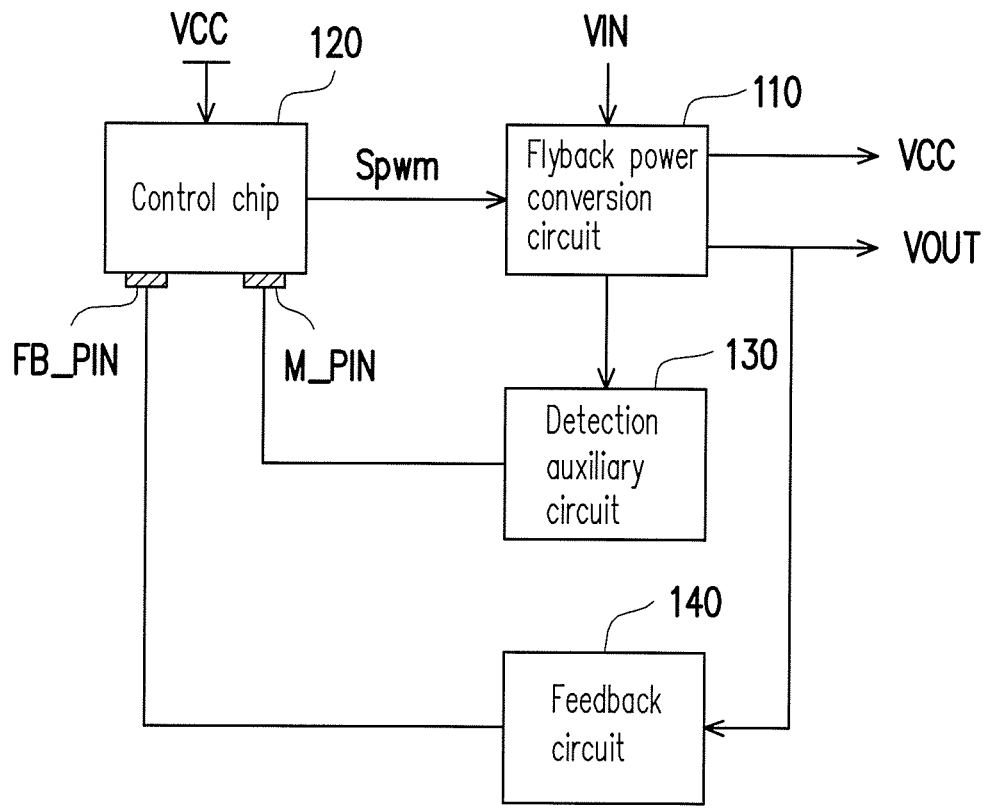
FIG. 1 is a schematic diagram illustrating a power conversion apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram illustrating a power conversion apparatus according to an embodiment of the invention. Referring to FIG. 1, a power conversion apparatus 100 of the present embodiment is flyback-based, wherein the power conversion apparatus 100 includes a flyback power conversion circuit 110, a control chip 120 and a detection auxiliary circuit 130.

In the present embodiment, the flyback power conversion circuit 110 is configured to receive an input voltage VIN, convert the input voltage VIN in response to a pulse width modulation (PWM) signal Spwm from the control chip 120, and thereby generate a direct current (DC) output voltage VOUT and a direct current (DC) system voltage VCC, wherein the DC output voltage VOUT will be provided to a load (not shown) and the DC system voltage VCC will be provided to the control chip 120 as a power source.

The control chip 120 is coupled to the flyback power conversion circuit 110, can be operated under the DC system voltage VCC generated by the flyback power conversion circuit 110, and thereby generated the PWM signal Spwm to control operations of the flyback power conversion circuit 110 in response to a power supplying requirement of the load. The control chip 120 has a plurality of pins, such as a multi-function detection pin M_PIN, a feedback pin FB_PIN and so forth, and the control chip 120 can receive operating information of the power conversion apparatus 100 respectively from the pins, so as to be used a basis for adjusting the outputted PWM signal Spwm.

The detection auxiliary circuit 130 is coupled to the flyback power conversion circuit 110 and the multi-function detection pin M_PIN of the control chip 120, and can be used to assist the control chip 120 in retrieving operating information related to the flyback power conversion circuit 110 (e.g., status of the input voltage VIN and the circuit resonance).

Moreover, in the present embodiment, the power conversion apparatus 100 may further selectively include a feedback circuit 140. The feedback circuit 140 is coupled between the feedback pin FB_PIN of the control chip 120 and an output terminal of the flyback power conversion circuit 110, can be used to sample the DC output voltage VOUT on the output terminal at a secondary side, and can feed back the information of the sampled voltage to a primary side so as to be provided to the control chip 120, so that the control chip 120 can determine a load state of the load coupled with the output terminal of the flyback power conversion circuit 110 according to the voltage on the feedback pin FB_PIN and thereby adjust a disabling/enabling period of the PWM signal Spwm.

Figure 2:
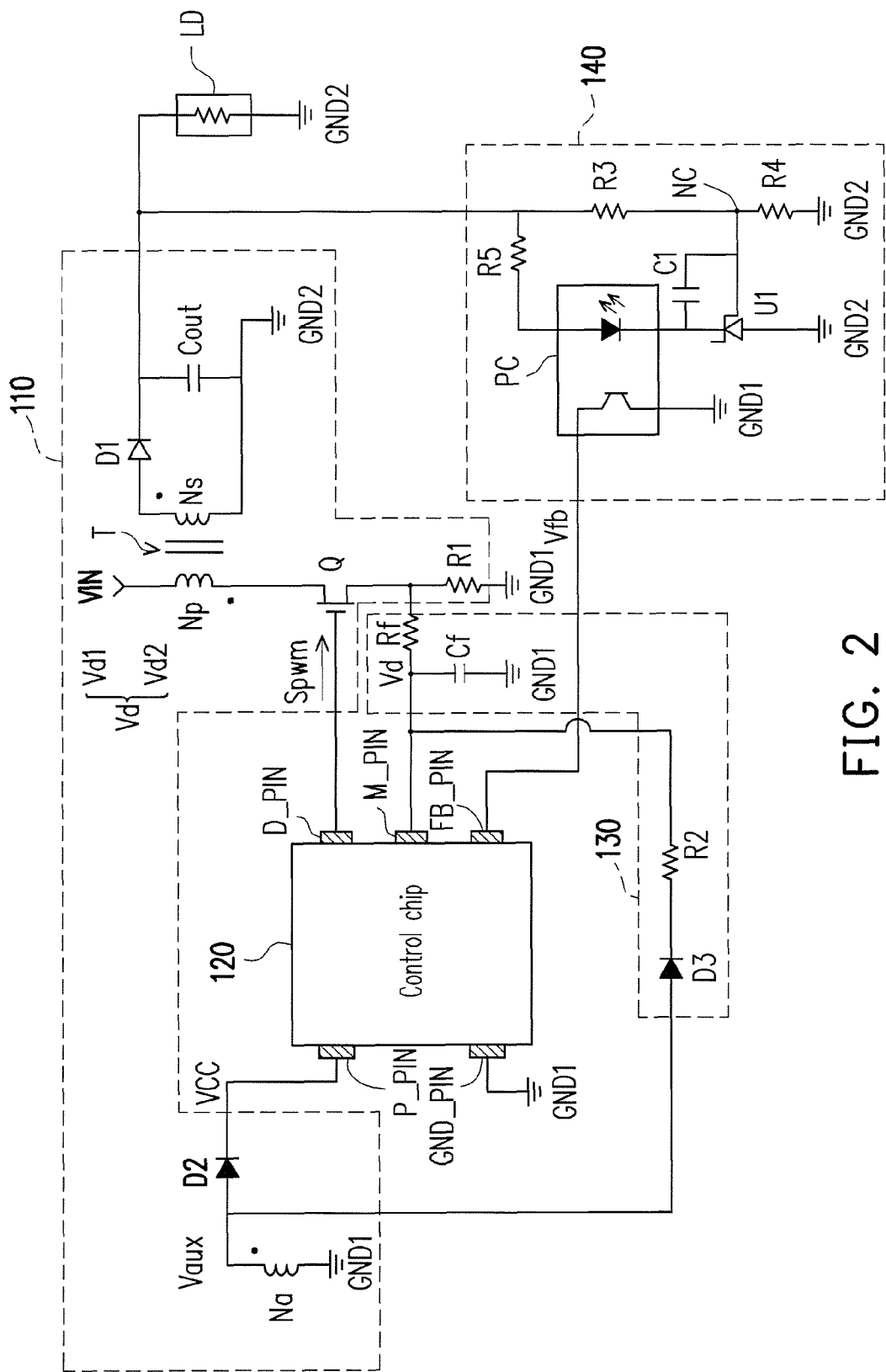
FIG. 2 is a schematic diagram illustrating a circuit scheme of the power conversion apparatus according to the embodiment of FIG. 1.

More specifically, FIG. 2 is a schematic diagram illustrating a circuit scheme of the power conversion apparatus according to the embodiment of FIG. 1. Referring to FIG. 1 and FIG. 2 together, the power conversion apparatus 100 of the present embodiment is, for example, configured to drive a load LD, wherein the load LD may, for example, be any type of electronic device, but the invention is not limited thereto.

In the present embodiment, the flyback power conversion circuit 110 includes a transformer T, a power switch Q (which is being illustrated with an N-type power switch in the figure, but not limited thereto), a resistor R1, diodes D1 and D2, and an output capacitor Cout. The control chip 120 has a driving pin D_PIN, a multi-function detection pin M_PIN, a feedback pin FB_PIN, a power pin P_PIN and a grounding pin GND_PIN. The detection auxiliary circuit 130 includes a diode D3, a resistor R2, a filter resistor Rf and a filter capacitor Cf. The feedback circuit 140 includes resistors R3, R4, R5, capacitor C1, a voltage regulator U1 and a photocoupler PC.

In the flyback power conversion circuit 110, the transformer T has a primary winding Np, a secondary winding Ns and an auxiliary winding Na. In the present embodiment, a primary-side circuit (i.e., a side of the primary winding Np and the auxiliary winding Na) uses a grounding terminal GND1 as a voltage reference point, and a secondary-side circuit (i.e., a side of the secondary winding Ns) uses a grounding terminal GND2 as a voltage reference point. The grounding terminals GND1 and GND2 may be seen as the same or different ground planes, but the invention is not limited thereto.

A common-polarity terminal (i.e., a dotted terminal) of the primary winding Np of the transformer T is coupled to the power switch Q, and an opposite-polarity terminal (i.e., a non-dotted terminal) of the primary winding Np of the transformer T is configured to receive the input voltage VIN. A common-polarity terminal of the secondary winding Ns of the transformer T is coupled to the diode D1, and an opposite-polarity terminal of the secondary winding Ns of the transformer T is coupled to the grounding terminal GND2 of the secondary side. A common-polarity terminal of the auxiliary winding Na of the transformer T is coupled to the diodes D2 and D3, and an opposite-polarity terminal of the auxiliary winding Na of the transformer T is coupled to the grounding terminal GND1 of the primary side.

A first terminal (e.g., a drain) of the power switch Q is coupled to the common-polarity terminal of the primary winding Np of the transformer T, a second terminal (e.g., a source) of the power switch Q is coupled to a first terminal of the resistor R1, and a control terminal (e.g., a gate) of the power switch Q is configured to receive the PWM signal Spwm from the control chip 120.

The first terminal of the resistor R1 is coupled to the second terminal of the power switch Q, and a second terminal of the resistor R1 is coupled to the grounding terminal GND1. An anode of the diode D1 is coupled to the common-polarity terminal of the secondary winding Ns of the transformer T, and a cathode of the diode D1 is configured to generate the DC output voltage VOUT for providing to the load LD. A first terminal of the output capacitor Cout is coupled to the cathode of the diode D1, and a second terminal of the output capacitor Cout is coupled to the grounding terminal GND2. An anode of the diode D2 is coupled to the common-polarity terminal of the auxiliary winding Na of the transformer T, and a cathode of the diode D2 is configured to generate the DC system voltage VCC.

In the control chip 120, the driving pin D_PIN thereof is coupled to the control terminal of the power switch Q, so as to provide the PWM signal Spwm for controlling an ON/OFF of the power switch Q. The multi-function detection pin M_PIN of the control chip 120 is coupled to the first terminal of the filter resistor Rf, so as to receive a detection voltage Vd. The feedback pin FB_PIN of the control chip 120 is coupled to an output terminal of the feedback circuit 140, so as to receive a feedback voltage Vfb which indicates a state of the load LD. The power pin P_PIN of the control chip 120的 is coupled to the cathode of the diode D2, so as to receive the DC system voltage VCC. The grounding pin GND_PIN of the control chip 120 is coupled to the grounding terminal GND1.

In the detection auxiliary circuit 130, an anode of the diode D3 is coupled to the common-polarity terminal of the auxiliary winding Na of the transformer T. A first terminal of the resistor R2 is coupled to a cathode of the diode D3, and a second terminal of the resistor R2 is coupled to the multi-function detection pin M_PIN. A first terminal of the filter resistor Rf is coupled to a second terminal of the resistor R2 and the multi-function detection pin M_PIN, and a second terminal of the filter resistor Rf is coupled to the first terminal of the resistor R1. A first terminal of the filter capacitor Cf is coupled to the first terminal of the filter resistor Rf, the second terminal of the resistor R2 and the multi-function detection pin M_PIN, and a second terminal of the filter capacitor Cf is coupled to the grounding terminal GND1. In the present embodiment, a voltage on the resistor R1 can be reacted on the filter capacitor Cf and the first terminal of the filter resistor Rf through a low pass filter constituted of the filter resistor Rf and the filter capacitor Cf, so as to be used as the detection voltage Vd for providing to the control chip 120.

In the feedback circuit 140, a first terminal of the resistor R3 is coupled to the cathode of the diode D1 and the load LD. A first terminal of the resistor R4 is coupled to a second terminal of the resistor R3, and a second terminal of the resistor R4 is coupled to the grounding terminal GND2. A first terminal of the resistor R5 is coupled to a first terminal at an input side of the photocoupler PC, and a second terminal of the resistor R5 is coupled to the first terminal of the resistor R3. The voltage regulator U1 is coupled between a second terminal at the input side of the photocoupler PC and the grounding terminal GND2, and a control terminal of the voltage regulator U1 is coupled to the second terminal of the resistor R3 and the first terminal of the resistor R4 (i.e., a node NC) and performs regulator operations in response to a voltage on the node NC. The capacitor C1 is coupled between a first terminal and the control terminal of the voltage regulator U1. The photocoupler PC generates the feedback voltage Vfb, which is related to the load state of the load LD, at an output side thereof to the control chip 120, in cooperation to the operations of the voltage regulator U1, according to the DC output voltage VOUT, so that the control chip 120 can use the feedback voltage Vfb as a basis for controlling the power switch Q. Herein, the feedback circuit is merely an exemplary schema, but the invention is not limited thereto.

More specifically, when the power conversion apparatus 100 operates normally, the control chip 120 may correspondingly generate the PWM signal Spwm for controlling the operations of the flyback power conversion circuit 110 in response to the power supplying requirement of the load LD. Under such condition, when the power switch Q is turned on in response to the PWM signal Spwm generated by the control chip 120, the input voltage VIN is connected across the primary winding Np of the transformer T, such that an inductor current of the primary winding Np of the transformer T may be linearly increased to execute an energy storage. At the same time, on the secondary winding Ns side, there is no current flowing through the secondary winding Ns of the transformer T due to the blocking of a reverse bias from the diode D1. In addition, on the auxiliary winding Na side, there is also no current flowing through the auxiliary winding Na of the transformer T due to the blocking of reverse biases from the diode D2 and the diode D3.

On the other hand, when the power switch Q is turned off in response to the PWM signal Spwm generated by the control chip 120, energy stored in the primary winding Np of the transformer T may be transferred to the secondary winding Ns and the auxiliary winding Na of the transformer T according to the Lenz's law. At the same time, because the diode D1 is turned on by a forward bias, the energy transferred to the secondary winding Ns of the transformer T may charge the output capacitor Cout and supply the DC output voltage VOUT to the load (the electronic device). Moreover, the energy transferred to the auxiliary winding Na of the transformer T may supply the DC system voltage VCC to the control chip 120 via the diode D2.

In view of above, it can be known that, based on an operating method in which the PWM signal PWM generated by the control chip 120 alternately turns on and off the power switch Q, the power conversion apparatus 100 is capable of continuously supplying the DC output voltage VOUT and the DC system voltage VCC.

Additionally mentioning that, although the detection auxiliary circuit 130 of the present embodiment is illustrated to include the diode D3 as an example, the invention is not limited thereto. The diode D3 is configured to provide better blocking of the reverse current; and in other embodiment, a schema the detection auxiliary circuit 130 without the diode D3 (i.e., the resistor R2 being directly coupled to the common-polarity terminal of the auxiliary winding Na) may also realize the blocking of the reverse current and assist the control chip 120 to obtain a function corresponding to the detection voltage Vd.

In addition, in the present embodiment, with the effect of the detection auxiliary circuit 130, the control chip 120 may determine whether a condition, such as over current, over voltage, under voltage or circuit resonance, has been occurred on the power conversion apparatus 100 by merely according to variations of the detection voltage Vd within an enabling period and a disabling period of the PWM signal Spwm.

In specific, the detection auxiliary circuit 130 assists the control chip 120 to obtain a first detection voltage Vd1 through the multi-function detection pin M_PIN within the enabling period of the PWM signal Spwm, so as to enable the control chip 120 to execute an over current detection according to the first detection voltage Vd1. On the other hand, the detection auxiliary circuit 130 assists the control chip 120 to obtain a second detection voltage Vd2 through the multi-function detection pin M_PIN within the disabling period of the PWM signal Spwm, so as to enable the control chip 120 to execute a valley voltage detection according to the second detection voltage Vd2.

As such, the control chip 120 of the present embodiment can realize a variety of different power detections and protection control mechanisms by merely using a single multi-function detection pin M_PIN. Hence, operation stability of the power conversion apparatus 100 can be maintained under the premise of not increasing the number of pins of the control chip 120.

Figure 3:
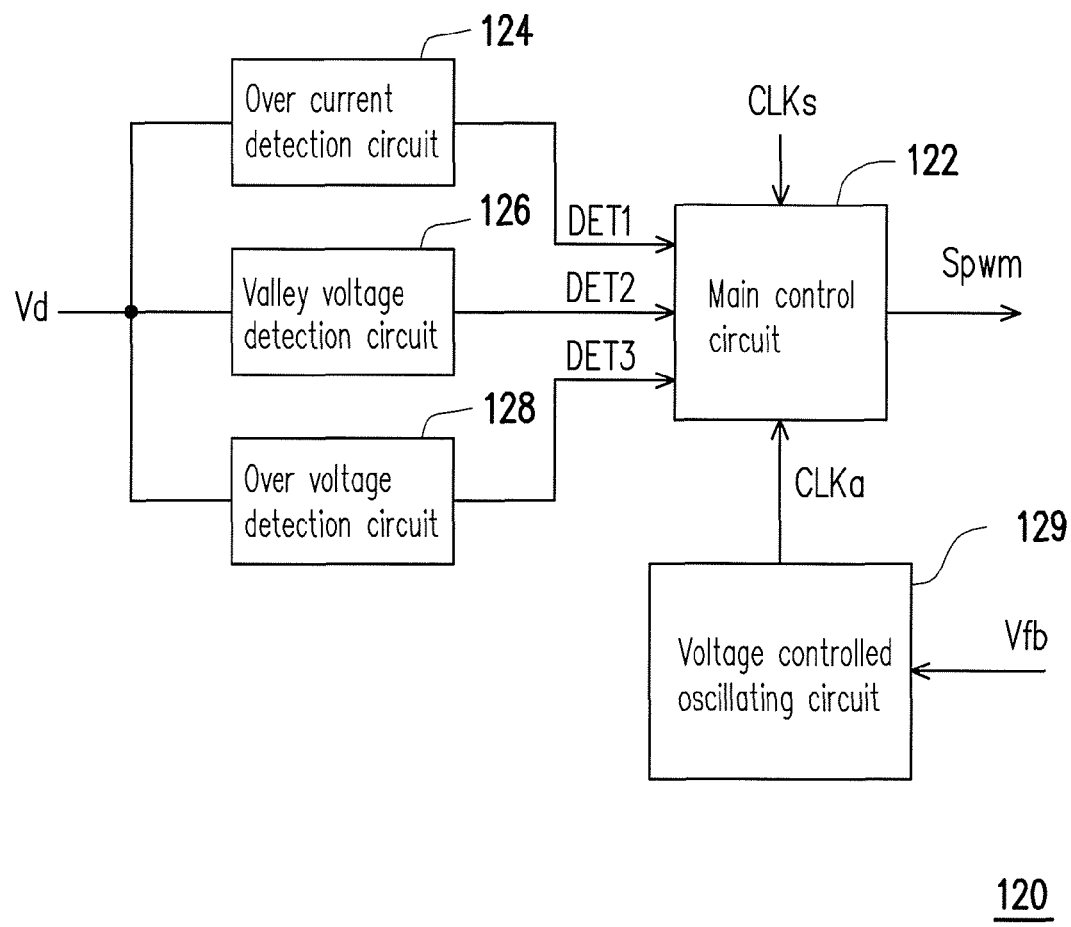
FIG. 3 is a functional block diagram of a control chip illustrated according to an embodiment of the invention.

In the following, FIG. 3 is firstly provided to explain the functional configuration of the control chip 120, and then, further accompanied by FIG. 4A and FIG. 4B, to explain the operations of the power conversion apparatus 100 within the enabling period and the disabling period of the PWM signal Spwm. FIG. 3 is a functional block diagram of a control chip illustrated according to an embodiment of the invention.

Referring to FIG. 3, the control chip 120 of the present embodiment includes a main control circuit 122, an over current detection circuit 124, a valley voltage detection circuit 126, an over voltage detection circuit 128 and a voltage controlled oscillating circuit 129.

The main control circuit 122 is configured to serve as an operation core of the control chip 120 and to generate the PWM signal Spwm in response to the power supplying requirement.

The over current detection circuit 124 is coupled between the multi-function detection pin M_PIN and the main control circuit 122. The over current detection circuit 124 is enabled within the enabling period of the PWM signal Spwm, so as to execute an over current detection in response to the first detection voltage Vd1, and thereby provide a detection result DET1 for indicating whether an over current has occurred or not to the main control circuit 122. Thus, the main control circuit 122 may determine whether to activate an over current protection mechanism in response to the detection result DET1.

The valley voltage detection circuit 126 is coupled between the multi-function detection pin M_PIN and the main control circuit 122. The valley voltage detection circuit 126 is activated within the disabling period of the PWM signal Spwm, so as to execute a valley voltage detection in response to the second detection voltage Vd2, and thereby provide a detection result DET2 for indicating the condition of resonance to the main control circuit 122. Thus, the main control circuit 122 may determine whether to enable the PWM signal Spwm for turning on or off the power switch Q in response to the detection result DET2.

The over voltage detection circuit 128 is coupled between the multi-function detection pin M_PIN and the main control circuit 122. The over voltage detection circuit 128 is activated within the disabling period of the PWM signal Spwm, so as to execute an over voltage/under voltage detection in response to the second detection voltage Vd2, and thereby provide a detection result DET3 for indicating whether the DC output voltage VOUT is in a normal working voltage range to the main control circuit 122. Thus, the main control circuit 122 may determine whether to activate an over voltage/under voltage protection mechanism in response to the detection result DET3.

The voltage controlled oscillating circuit 129 is coupled between the feedback pin FB_PIN and the main control circuit 122. The voltage controlled oscillating circuit 129 may be configured to generate a corresponding clock adjustment signal CLKa according to the feedback voltage Vfb received from the feedback pin FB_PIN, so the main control circuit 122 may adjust a frequency of the PWM signal Spwm according to the clock adjustment signal CLKa. In other words, the size of the feedback voltage Vfb is indicative of the magnitude of the load LD, and thus the main control circuit 122 may determine the frequency of the PWM signal Spwm according to the magnitude of the load LD.

For example, in case that the load LD is operated under heavy load, the voltage controlled oscillating circuit 129 will correspondingly generate a clock adjustment signal CLKa with higher frequency according to a higher feedback voltage Vfb, so the main control circuit 122 may raise the frequency of the PWM signal Spwm according to the clock adjustment signal CLKa; contrarily, in case that the load LD is operated under light load, the voltage controlled oscillating circuit 129 will correspondingly generate a clock adjustment signal CLKa with lower frequency according to a lower feedback voltage Vfb, so the main control circuit 122 may lower the frequency of the PWM signal Spwm according to the clock adjustment signal CLKa.

In addition, in an exemplary embodiment, the main control circuit 122 may further set a masked period according to the clock adjustment signal CLKa generated by the voltage controlled oscillating circuit 129, so the main control circuit 122 may modulate actions of the valley voltage detection according to the load state, and thereby lower a power dissipation of the overall power source conversation. This part will be described later.

Figure 4A:
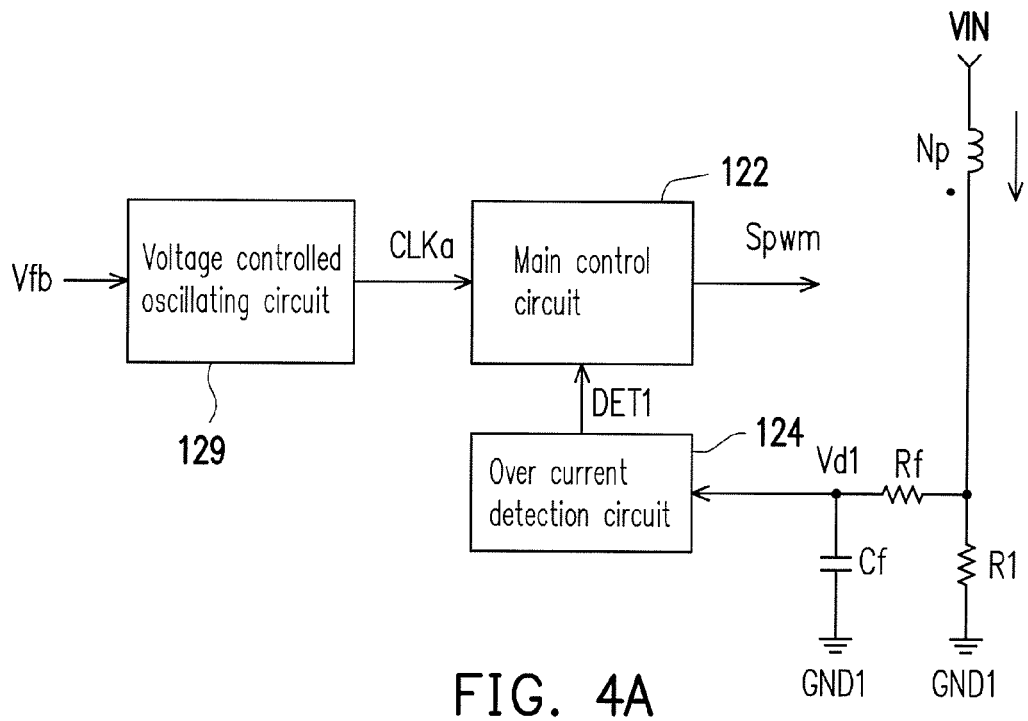
FIG. 4A is a schematic diagram illustrating an equivalent circuit of a power conversion apparatus during an ON period of a power switch according to an embodiment of the invention.
Figure 4B:
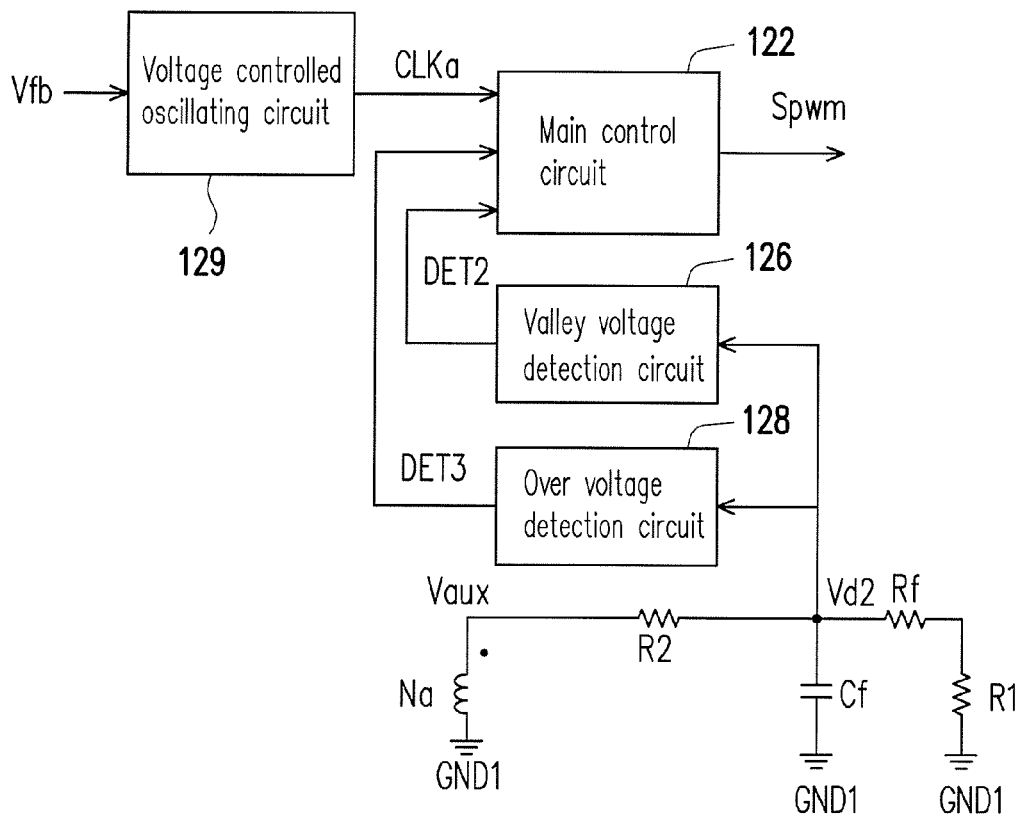
FIG. 4B is a schematic diagram illustrating an equivalent circuit of a power conversion apparatus during an OFF period of a power switch according to an embodiment of the invention.
Figure 5A:
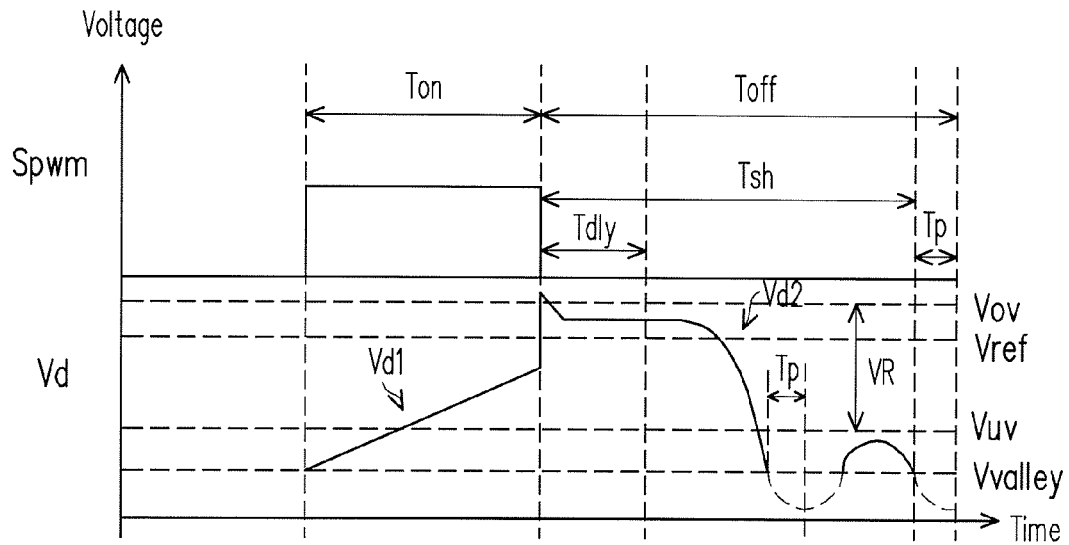
FIG. 5A is a schematic diagram illustrating a signal timing of a power conversion apparatus according to an embodiment of the invention.

In the following, schemas of the equivalent circuit of FIG. 4A and FIG. 4B, as accompanied by the signal timings of FIG. 5A, are provided to explain the operations of the equivalent circuit of the power conversion apparatus 100 within an ON period (i.e., the enabling period Ton of the PWM signal Spwm) and an OFF period (i.e., the disabling period Toff of the PWM signal Spwm) of the power switch Q. FIG. 4A is a schematic diagram illustrating an equivalent circuit of a power conversion apparatus during an ON period of a power switch according to an embodiment of the invention. FIG. 4B is a schematic diagram illustrating an equivalent circuit of a power conversion apparatus during an OFF period of a power switch according to an embodiment of the invention. FIG. 5A is a schematic diagram illustrating a signal timing of a power conversion apparatus according to an embodiment of the invention.

Referring to FIG. 2, FIG. 4A and FIG. 5A at the same time, within the enabling period Ton of the PWM signal Spwm (e.g., within a period of high level, but not limited thereto), the power switch Q is turned on in response to the enabled PWM signal Spwm. At this moment, the power conversion apparatus 100 forms a conduction path between the input voltage VIN and the grounding terminal GND1 through the primary winding Np of the transformer T, the power switch Q and the resistor R1. The primary winding Np executes the energy storage in response to a voltage difference between the input voltage VIN and the grounding terminal GND1, and thereby gradually increases the inductor current flow through this conduction path. At the same time, the voltage on the resistor R1 also gradually increases within the enabling period Ton of the PWM signal Spwm in response to the gradually increasing current.

In addition, within the enabling period Ton of the PWM signal Spwm, the auxiliary winding Na, as induced by a voltage drop of the primary winding Np, generates an auxiliary voltage Vaux with negative voltage, wherein a voltage value of the auxiliary voltage Vaux is determined according to the input voltage VIN and a winding ratio between the primary winding Np and the auxiliary winding Na. Herein, the auxiliary voltage Vaux with negative voltage causes the diodes D2 and D3 to be in a state of reverse bias, and thus the detection auxiliary circuit 130 can be equivalent to being open. Based on this, the first terminal of the filter resistor Rf will generate and transmit the corresponding first detection voltage Vd1 to the control chip 120 in response to a voltage change on the resistor R1.

Moreover, in the control chip 120, the valley voltage detection circuit 126 and the over voltage detection circuit 128 will be disabled within the enabling period Ton of the PWM signal Spwm, and only the over current detection circuit 124 will continue to operate. Therefore, the equivalent circuit of the power conversion apparatus 100 within the enabling period Ton of the PWM signal Spwm may be as shown in FIG. 4A.

More specifically, within the enabling period Ton of the PWM signal Spwm, the over current detection circuit 124 compares the first detection voltage Vd1 with the over current reference voltage Vref. If the over current detection circuit 124 determines that the first detection voltage Vd1 is greater than an over current reference voltage Vref, then it indicates that an over current might be occurred at this moment. Thus, the over current detection circuit 124 outputs the detection result DET1 for indicating that the over current has occurred to the main control circuit 122. When the main control circuit 122 receives the detection result DET1 for indicating that the over current has occurred, the main control circuit 122 activates the over current protection mechanism to suspend outputting the PWM signal Spwm (i.e., by switching the PWM signal Spwm to a disable level\low level).

On the other hand, if the over current detection circuit 124 determines that the first detection voltage Vd1 is smaller than the over current reference voltage Vref, then it indicates that there is no over current being occurred at this moment. Thus, the over current detection circuit 124 outputs the detection result DET1 for indicating that the over current has not occurred to the main control circuit 122. When the main control circuit 122 receives the detection result DET1 for indicating that the over current hat not occurred, the main control circuit 122 turns off the over current protection mechanism.

In an exemplary embodiment of the invention, the over current detection circuit 124 may be realized using a schema of a comparator (not shown), but the invention is not limited thereto. More specifically, under the exemplary embodiment in which the over current detection circuit 124 is realized with the comparator, a positive input terminal of the comparator may be coupled to the first terminal of the filter resistor Rf via the multi-function detection pin M_PIN, so as to receive the first detection voltage Vd1, and a negative input terminal of the comparator may receive the over current reference voltage Vref. Based on this, the comparator may generate the corresponding detection result DET1 for the main control circuit 122 according to a comparison result between the first detection voltage Vd1 and the over current reference voltage Vref.

On the other hand, within the disabling period Toff of the PWM signal Spwm (e.g., during a period of low level, but not limited thereto), the power switch Q is turned off in response to the disabled PWM signal Spwm. At this moment, energy stored by the primary winding Np of the transformer T is transferred to the secondary winding Ns and the auxiliary winding Na of the transformer T, so that the diode D1 is in a state of being turned on by the forward bias in response to a voltage drop of the secondary winding Ns, and the diodes D2 and D3 are in a state of being turned on by the forward bias in response to the auxiliary voltage Vaux.

In other words, during the disabling period Toff of the PWM signal Spwm, the detection auxiliary circuit 130 can be equivalent to being coupled to the resistor R2 between the auxiliary winding Na and the multi-function detection pin M_PIN, and thus the second detection voltage Vd2 is determined by a sum (i.e., R1+Rf) of the auxiliary voltage Vaux applied to the resistor R1 and the filter resistor Rf and a dividing voltage of the resistor R2.

Moreover, in the control chip 120, the over current detection circuit 124 will be turned off within the disabling period Toff of the PWM signal Spwm, and only the valley voltage detection circuit 126 and the over voltage detection circuit 128 will continue to operate. Therefore, the equivalent circuit of the power conversion apparatus 100 within the disabling period Toff of the PWM signal Spwm can be as shown in FIG. 4B.

Before the transferring of the energy stored by the primary winding Np of the transformer T is completed, the second detection voltage Vd2 is maintained at a stable voltage value in response to the auxiliary voltage Vaux. The stable voltage value is determined according to a voltage value of the DC output voltage VOUT and a winding ratio between the secondary winding Ns and the auxiliary winding Na.

Within this period, the over voltage detection circuit 128 may determine whether the operation of the power conversion apparatus 100 has an over voltage or under voltage problem according to the size of the second detection voltage Vd2 related to the DC output voltage VOUT.

Specifically, the over voltage detection circuit 128 may determine whether the second detection voltage Vd2 is in a working voltage range VR within the disabling period Toff of the PWM signal Spwm, wherein the working voltage range VR is defined according to an upper limit voltage Vov and a lower limit voltage Vuv (values can be designed by designers, and the invention is not limited thereto). If the over voltage detection circuit 128 determines that the second detection voltage Vd2 is greater than the upper limit voltage Vov or smaller than the lower limit voltage Vuv (i.e., outside of the working voltage range VR), then the over voltage detection circuit 128 will output the detection result DET3 for indicating that the over voltage/under voltage has occurred.

At this moment, the main control circuit 122 will activate the over voltage/under voltage protection mechanism in response to the detection result DET3 being received, so as to suspend outputting the PWM signal Spwm or to lower the frequency of the PWM signal Spwm.

Contrarily, if the over voltage detection circuit 128 determines that the second detection voltage Vd2 is in the working voltage range VR within the disabling period Toff of the PWM signal Spwm, then the over voltage detection circuit 128 will outputs the detection result DET3 for indicating that the over voltage/under voltage has not occurred, so the main control circuit 122 will turn off the over voltage/under voltage protection mechanism in response to the detection result being received, so as to resume outputting the PWM signal Spwm.

Additionally mentioning that, in an exemplary embodiment of the invention, to prevent the over voltage detection circuit 128 from produce a false determination caused by possible overshoot or under shoot voltage during the switching the power switch Q, the over voltage detection circuit 128 may be set to perform the action of determining whether the second detection voltage Vd2 is in the working voltage range VR or not after a delay period Tdly (may be defined by the designer based on design considerations, and the invention is not limited thereto), so as to enhance an accuracy of the over voltage/under voltage detection, but the invention is not limited thereto.

Next, after the transferring of the energy stored by the primary winding Np of the transformer T is completed, a resonance is generated by parasitic capacitances of the primary winding Np and the power switch Q and the inductance in the primary winding Np, and a resonance signal on the primary winding Np is induced to the secondary winding Ns side and the auxiliary winding Na side, so a voltage waveform of the second detection voltage Vd2 appears to be in a signal form of oscillating back and forth between a peak and a valley.

Within this period, in order to lower a switching loss of the power switch Q due to the resonance, the valley voltage detection circuit 126 may learn whether the power conversion apparatus 100 has occurred resonance through determining whether the second detection voltage Vd2 is smaller than a valley reference voltage Vvalley, wherein the main control circuit 122 enables the power switch Q when the power conversion apparatus 100 starts to occur resonance and when the resonance signal reaches the valley, so as to enhance the conversion efficiency of the power conversion apparatus 100.

More specifically, the valley voltage detection circuit 126 compares the second detection voltage Vd2 with the valley reference voltage Vvalley. If the valley voltage detection circuit 126 determines that the second detection voltage Vd2 is greater than or equal to the valley reference voltage Vvalley, then it indicates that the power conversion apparatus 100 has not occurred resonance (or the resonance signal has not reached the valley), and thus the valley voltage detection circuit 126 outputs the detection result DET2 for indicating that the resonance has not occurred. When the main control circuit 122 received the detection result DET2 for indicating that the resonance has not occurred, the main control circuit 122 keeps the PWM signal Spwm at the disable level/low level.

Generally, in cases that the second detection voltage Vd2 occurs resonance, because the opposite-polarity terminal of the auxiliary winding Na is coupled to the grounding terminal GND1, in the resonance signal in response to the second detection voltage Vd2, signal lower than the level of the grounding terminal GND1 is clamped at the level of the grounding terminal GND1. As a result, the valley voltage detection circuit 126 can only determine that the resonance signal is about to be dropped to the valley when the second detection voltage Vd2 is lower than the valley reference voltage Vvalley, but is unable to directly determine the real valley.

Therefore, in the present embodiment, the valley voltage detection circuit 126 calculates a time for the valley of the resonance signal to appear based on a resonance frequency (which is obtained according to the parasitic capacitance value of the primary winding Np and the power switch Q and the inductance value in the primary winding Np), and uses this time as a predetermined time Tp. The valley voltage detection circuit 126 outputs the detection result DET2 for indicating the resonance has occurred only when determining that the second detection voltage Vd2 is greater than the valley reference voltage Vvalley and reaches the predetermined period Tp, so the main control circuit 122 adjusts the PWM signal Spwm to an enable level/high level in response to the detection result DET2, and thus the power switch Q can be switched when the resonance signal approaches the valley.

In addition, to prevent the PWM signal Spwm from being frequently switched and thereby causing power dissipation due to the resonance frequency being higher at the light load, in an exemplary embodiment of the invention, the main control circuit 122 may further define a masked period (e.g., Tsh) according to the frequency of the PWM signal Spwm, wherein the main control circuit 122 does not perform the action of determining whether to adjust the level of PWM signal Spwm according to the detection result DET2 within the defined masked period Tsh.

For example, as shown in FIG. 5A, the main control circuit 122 of the present embodiment may define the masked period Tsh according to the clock adjustment signal CLKa generated by the voltage controlled oscillating circuit 129h. Since the main control circuit 122 will not adjust the level of the PWM signal Spwm according to the detection result DET2 within the masked period Tsh, the PWM signal Spwm will not be switched to the enable level at the first valley of the second detection voltage Vd2, and instead, the PWM signal Spwm will be switched to the enable level according to the location of the second valley of the second detection voltage Vd2 after the masked period Tsh, so as to turn on the power switch Q. As such, based on the magnitude of the load LD, the main control circuit 122 may determine at which valley of the resonance signal does the power switch Q is to be switched.

Figure 5B:
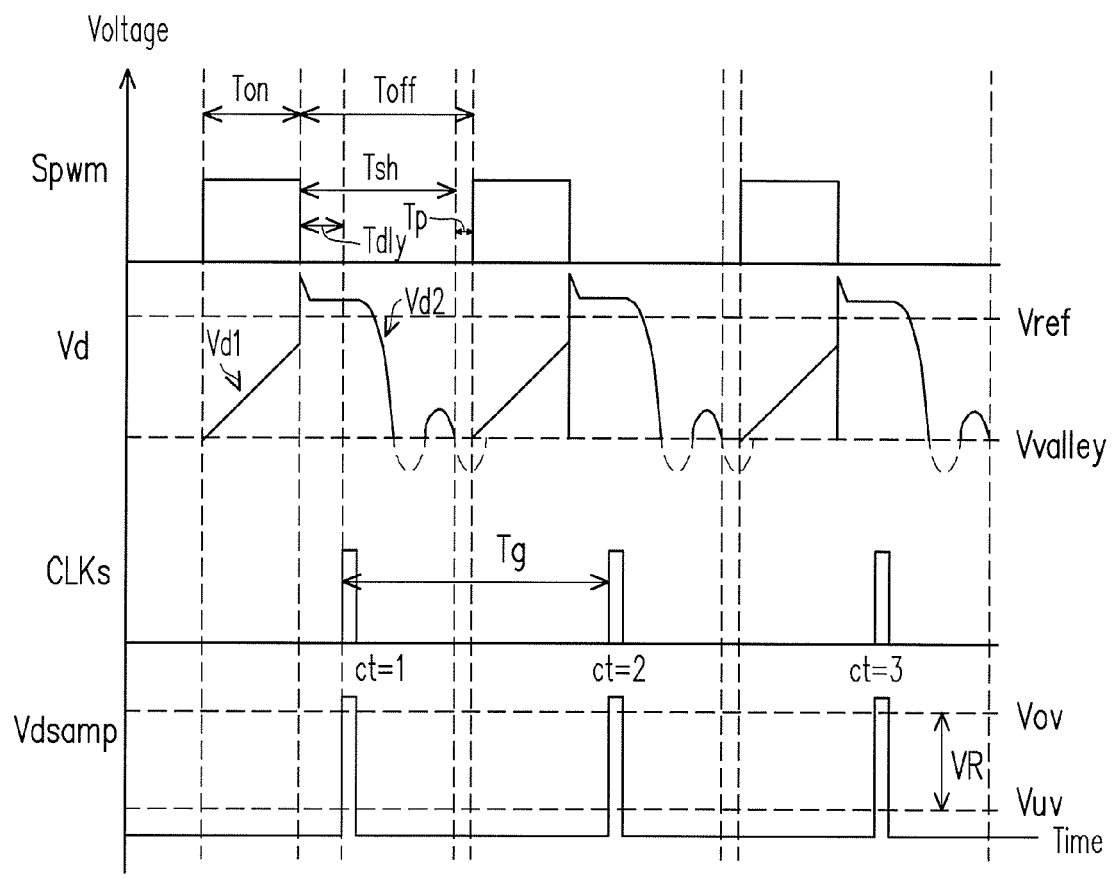
FIG. 5B is a schematic diagram illustrating a signal timing of a power conversion apparatus according to another embodiment of the invention.

FIG. 5B is a schematic diagram illustrating a signal timing of a power conversion apparatus according to another embodiment of the invention. Referring to FIG. 4B and FIG. 5B at the same time, in order to enhance the accuracy of the over voltage detection, the over voltage detection circuit 128 of the present embodiment may further sample the second detection voltage Vd2 with a predetermined time interval Tg according to a sampling clock signal CLKs, wherein the over voltage detection circuit 128 first determines whether the sampled second detection voltage Vd2 is in the working voltage range VR, and then generate a count value Ct according to the determination result. The over voltage detection circuit 128 determines that the DC output voltage VOUT has occurred over voltage/under voltage when the count value Ct reaches a threshold value, and thereby generate the corresponding detection result DET3 to the main control circuit 122.

For example, the over voltage detection circuit 128 samples the second detection voltage Vd2 when the sampling clock signal CLKs is enabled, and thereby obtains a sampled voltage Vdsamp. The over voltage detection circuit 128 compares the sampled voltage Vdsamp with the upper limit voltage Vov and the lower limit voltage Vuv, respectively, so as to determine whether the sampled voltage Vdsamp is in the working voltage range VR.

As shown in FIG. 5B, assuming that the present embodiment sets the threshold value for determining an occurrence of the over voltage/under voltage to be 3, in first to third cycles of the PWM signal Spwm, the over voltage detection circuit 128 will determine that the sampled voltage Vdsamp is greater than the upper limit voltage Vov, and gradually accumulate the count values Ct from 0 to 3 in each cycle.

In the first and the second cycles of the PWM signal Spwm, because the count value Ct has not yet reached the threshold value, the over voltage detection circuit 128, within this period, will still generate the detection result DET3 for indicating that the over voltage/under voltage has not occurred to the main control circuit 122. Therefore, the main control circuit 122 will not trigger the over voltage/under voltage protection mechanism within this period.

When the count value Ct reaches 3, the over voltage detection circuit 128 will determine that the DC output voltage VOUT has occurred over voltage, and generate the detection result DET3 for indicating that the over voltage has occurred to the main control circuit 122, so the main control circuit 122 will trigger the over voltage protection mechanism in response to the detection result DET3, and thereby suspend outputting the PWM signal Spwm or lower the frequency of the PWM signal Spwm until the second detection voltage Vd2 drops back within the working voltage range VR again (specific practices will not be limited thereto).

It is worth mentioning that, although the above embodiment are all explained with the examples of using three different power protection mechanisms (the over current detection, the over voltage detection, the valley voltage detection) simultaneously, the invention is not limited thereto. In other embodiments, the power conversion apparatus 100 may also only use the power protection mechanisms consisting of over current detection and valley voltage detection, but does not use a same multi-function detection pin M_PIN, to realize the over voltage detection. In other words, power conversion apparatuses capable of simultaneously realizing the over current detection and the valley voltage detection are all within the protection scope of the invention as long as they are achieved with the effect of the detection auxiliary circuit by using a same multi-function detection pin M_PIN, and this must be firstly stated herein.

In summary, the power conversion apparatus, as provided according to the embodiments of the invention, with the effect of the detection auxiliary circuit, is capable of allowing the control chip to realize various different control, detection and protection functions through the configuration in which a single multi-function detection pin is commonly used. As a result, in addition to providing various related detection functions and control methods, the single multi-function detection pin of the control chip may further lower the overall production costs of the control chip.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power conversion apparatus, comprising:
   a flyback power conversion circuit, configured to receive an input voltage and convert the input voltage in response to a pulse width modulation (PWM) signal, so as to generate a direct current (DC) output voltage and provide the DC output voltage to a load;
   a control chip, coupled to the flyback power conversion circuit to generate the PWM signal for controlling operations of the flyback power conversion circuit, wherein the control chip has a multi-function detection pin; and
   a detection auxiliary circuit, coupled to the flyback power conversion circuit and the multi-function detection pin of the control chip,
   wherein the detection auxiliary circuit assists the control chip to obtain a first detection voltage via the multi-function detection pin within an enabling period of the PWM signal, so as to execute an over current detection according to the first detection voltage, and
   the detection auxiliary circuit assists the control chip to obtain a second detection voltage via the multi-function detection pin within a disabling period of the PWM signal, so as to execute a valley voltage detection according to the second detection voltage,
   wherein the control chip comprises:
      a main control circuit, configured to serve as an operation core of the control chip, and generate the PWM signal in response to a power supplying requirement;
      an over current detection circuit, coupled between the multi-function detection pin and the main control circuit, configured to execute the over current detection in response to the first detection voltage within the enabling period of the PWM signal, and thereby provide a first detection result to the main control circuit, wherein the main control circuit determines whether to activate an over current protection mechanism in response to the first detection result; and
      a valley voltage detection circuit, coupled between the multi-function detection pin and the main control circuit, configured to execute the valley voltage detection in response to the second detection voltage within the disabling period of the PWM signal, and thereby provide a second detection result to the main control circuit, wherein the main control circuit determines whether to enable the PWM signal in response to the second detection result.

2. The power conversion apparatus as recited in claim 1, wherein the over current detection circuit compares the first detection voltage with an over current reference voltage within the enabling period of the PWM signal, the over current detection circuit outputs the first detection result for indicating that an over current has occurred when determining that the first detection voltage is greater than the over current reference voltage, and the over current detection circuit outputs the first detection result for indicating that the over current has not occurred when determining that the first detection voltage is smaller than the over current reference voltage.

3. The power conversion apparatus as recited in claim 2, wherein when the main control circuit receives the first detection result for indicating that the over current has occurred, the main control circuit activates the over current protection mechanism so as to suspend outputting the PWM signal, and when the main control circuit receives the first detection result for indicating that the over current has not occurred, the main control circuit turns off the over current protection mechanism so as to resume outputting the PWM signal.

4. The power conversion apparatus as recited in claim 1, wherein the valley voltage detection circuit compares the second detection voltage with a valley reference voltage within the disabling period of the PWM signal, the valley voltage detection circuit outputs the second detection result for indicating that a resonance has not occurred when determining that the second detection voltage is greater than the valley reference voltage, and the valley voltage detection circuit outputs the second detection result for indicating that the resonance has occurred when determining that the second detection voltage is smaller than the valley reference voltage and reaches a predetermined period.

5. The power conversion apparatus as recited in claim 4, wherein when the main control circuit receives the second detection result for indicating that the resonance has not occurred, the main control circuit keeps the PWM signal at a disable level, and when the main control circuit receives the second detection result for indicating that the resonance has occurred, the main control circuit adjusts the PWM signal to an enable level.

6. The power conversion apparatus as recited in claim 5, wherein the main control circuit further defines a masked period according to a frequency of the PWM signal, and the main control circuit does not perform an action of determining whether to adjust the level of the PWM signal according to the second detection result within the masked period.

7. The power conversion apparatus as recited in claim 6, wherein the control chip further has a feedback pin, the control chip obtains a feedback voltage related to a load state from the feedback pin, and the control chip further comprises:
 a voltage controlled oscillating circuit, configured to generate a clock adjustment signal according to the feedback voltage, so that the main control circuit adjusts the frequency of the PWM signal according to the clock adjustment signal, wherein the main control circuit further sets a length of the masked period according to the clock adjustment signal.

8. The power conversion apparatus as recited in claim 1, wherein the control chip further comprises:
 an over voltage detection circuit, coupled between the multi-function detection pin and the main control circuit, configured to execute an over voltage/under voltage detection in response to the second detection voltage within the disabling period of the PWM signal, and thereby provide a third detection result to the main control circuit, wherein the main control circuit determines whether to activate an over voltage/under voltage protection mechanism in response to the third detection result.

9. The power conversion apparatus as recited in claim 8, wherein the over voltage detection circuit determines whether the second detection voltage is in a voltage working range within the disabling period of the PWM signal, the over voltage detection circuit outputs the third detection result for indicating that an over voltage/under voltage has occurred when determining that the second detection voltage is outside of the voltage working range, and the over voltage detection circuit outputs the third detection result for indicating that the over voltage/under voltage has not occurred when determining that the second detection voltage is in the voltage working range.

10. The power conversion apparatus as recited in claim 9, wherein when the main control circuit receives the third detection result for indicating that the over voltage/under voltage has occurred, the main control circuit activates the over voltage/under voltage protection mechanism so as to suspend outputting the PWM signal, and when the main control circuit receives the third detection result for indicating that the over voltage/under voltage has not occurred, the main control circuit turns off the over voltage/under voltage protection mechanism so as to resume outputting the PWM signal.

11. The power conversion apparatus as recited in claim 10, wherein the over voltage detection circuit performs an action of determining whether the second detection voltage is in the voltage working range after a delay period.

12. The power conversion apparatus as recited in claim 8, wherein the over voltage detection circuit further samples the second detection voltage with a predetermined time interval according to a sampling clock signal, determines whether the sampled second detection voltage is in a voltage working range, and then generates a count value according to a determination result, wherein the over voltage detection circuit compares the count value with a threshold value, and the over voltage detection circuit outputs the third detection result for indicating that an over voltage/under voltage has occurred when determining that the count value reaches the threshold value, and outputs the third detection result for indicating that the over voltage/under voltage has not occurred when determining that the count value does not reach the threshold value.

13. The power conversion apparatus as recited in claim 1, wherein the flyback power conversion circuit comprises:
 a transformer, having a primary winding, a secondary winding and an auxiliary winding, wherein an opposite-polarity terminal of the primary winding is configured to receive the input voltage, an opposite-polarity terminal of the auxiliary winding is coupled to a first grounding terminal, and an opposite-polarity terminal of the secondary winding is coupled to a second grounding terminal;
 a power switch, having a first terminal coupled to a common-polarity terminal of the primary winding, and a control terminal coupled to the control chip for receiving the PWM signal;
 a first resistor, having a first terminal coupled to a second terminal of the power switch and the multi-function detection pin, and a second terminal coupled to the first grounding terminal;
 a first diode, having an anode thereof coupled to a common-polarity terminal of the secondary winding, and a cathode outputting the DC output voltage;
 an output capacitor, coupled between the cathode of the first diode and the second grounding terminal; and
 a second diode, having an anode coupled to a common-polarity terminal of the auxiliary winding, and a cathode outputting a DC system voltage to the control chip.

14. The power conversion apparatus as recited in claim 13, wherein the detection auxiliary circuit comprises:
 a second resistor, having a first terminal coupled to the common-polarity terminal of the auxiliary winding and the anode of the second diode, and a second terminal coupled to the multi-function detection pin.

15. The power conversion apparatus as recited in claim 14, wherein the detection auxiliary circuit further comprises:
 a filter resistor, coupled between the multi-function detection pin and the first terminal of the first resistor; and
 a filter capacitor, having a first terminal coupled to a first terminal of the filter resistor, the second terminal of the second resistor and the multi-function detection pin, and a second terminal coupled to the first grounding terminal.

16. The power conversion apparatus as recited in claim 15, wherein the detection auxiliary circuit comprises:
 a third diode, connected with the second resistor in series, wherein an anode of the third diode is coupled to the common-polarity terminal of the auxiliary winding and the anode of the second diode, and a cathode of the third diode is coupled to the first terminal of the second resistor.

\* \* \* \* \*